June 25, 1963  J. H. McGINLEY ETAL  3,094,929
DETONATING SYSTEM
Filed July 29, 1960

INVENTOR.
JAMES H. McGINLEY
CLYDE W. DICKEY
BY CARL VOLZ

Roy C. Hopgood
ATTORNEY 3,094,929
DETONATING SYSTEM
James H. McGinley, Clyde W. Dickey, and Carl Volz, State College, Pa., assignors to HRB-Singer, Inc., State College, Pa., a corporation of Pennsylvania
Filed July 29, 1960, Ser. No. 46,171
8 Claims. (Cl. 102—18)

This invention relates to a charge detonating system or firing fuse, and more particularly to a fuse for firing a subsurface charge such as a land mine.

An object of the invention is to provide a firing fuse for detecting at least two significant effects of a body to determine whether or not to fire. More particularly, the novel firing fuse detects electrical reactance and weight dependent effects produced by the body. The reactance effect is one resulting from magnetic variations attributable to the body, and the weight dependent effect is specifically the kinetic effect of the body in motion as expressed in transmitted vibrations.

In its more specific aspect, the invention provides a vibration-magnetic fuse capable of being fired in response to a combination of vibrational and magnetic variations produced by an approaching body. Means are provided by the invention for determining (calibrating or presetting) the weights or values to be accorded to the vibration and magnetic effects so as to enable the fuse to discriminate with particularity between objects to be subjected to the charge and those to be passed by.

The vibration sensitive and magnetically sensitive components of the fuse can be arranged for concurrent or sequential action to arrive at a resultant evaluation of these two control factors. Preferably, the vibration sensitive component of the fuse applies its output to the magnetically sensitive component, which in turn directs its output to a detonator.

The arrangement and construction are such that no battery power is required for the vibration sensitive means. Battery power, however, is required for the magnetic sensitive means when turned on by the vibration sensitive means, whereby the battery life ordinarily endures for the normal life of the mine to which the fuse is applied.

Among other objects and advantages of the invention are the construction and arrangement of parts of an electrical firing fuse particularly for use with a land mine, which makes effective use of crystal and magnetic pickups and which functions with solid state switches for producing electrical firing impetus without moving parts or contacts or mechanical inertia. Further, the novel construction requires no contacts to burn or pit and can be supplied as a potted unit which has high shock resistance.

The above mentioned and other features and objects of this invention and the manner of attaining them will become more apparent and the invention itself will be best understood by reference to the following description of an embodiment of the invention taken in conjunction with the accompanying drawing, which is a schematic diagram of the novel vibration-magnetic fuse system.

Referring now to the drawing, the novel land mine detonating system comprises a vibration-sensitive circuit 1, a magnetic mass detection circuit 2, and a detonator 3.

The circuit 1 comprises a vibration-sensitive pick-up including a crystal 4 and a superposed mass 6. The mass is attached to the crystal and serves to lower the Q of the crystal. The crystal 4 can be, for example, a barium titanate crystal or other well known piezoelectric material. The surface of the crystal, remote from the mass, is attached to the land mine casing 5. The crystal 4, being piezoelectric, produces electrical energy in response to vibrations, so that as an object, such as a tank, approaches the location of the mine casing, the vibrations generated by the weight and motion of the object, are transmitted through the earth to the mine casing. The mass 6 bonded to the crystal serves also to alter the natural frequency of the crystal.

The electrical energy generated by the crystal 4 is fed through a diode 7 to an energy storing device, which in the illustrated embodiment is a capacitor 8. The capacitor is connected to the input of an amplifier and phase shifting circuit 10, which is part of a resonant circuit generally indicated at 9.

The resonant circuit 9 includes a resonant bar 11, which is fixed at one end to the mine casing 5, and at the opposite end is provided with a magnetic mass 12, such as ferrite. The mass 12 is suspended between electrical coils 13, 14, which act as driving and pickup coils, respectively. The resonant bar with its ferrite mass suspended between the two coils is designed to vibrate in response to the tank-produced vibrations, but not sufficiently to produce significant voltages in the coils. Once the vibration of the bar is started, the amplifier and phase shift device are required to drive the bar to resonance.

The magnetic resonating system requires only a minute amount of power to sustain its oscillations; just enough power is required to compensate for the loss in the circuit. This power is supplied from the capacitor 8, which is charged by the voltage generated by the crystal.

The phase shift circuit 10 shifts the phase of the energy supplied by one of the coils relative to the other, so that the output energy is added to produce a single, in-phase output. If a single coil were utilized, it would, of course, be unnecessary to feed the energy to a phase shifting device.

The output of circuit 9 is obtained at lead 15, which connects the driving coil 13 to a normally open switch 16. The normally open switch 16 is closed by energy from the driving coil, provided the energy is of sufficient amplitude. The energy attains the sufficient amplitude only when the vibrations detected by the circuit correspond to those of an object which it is desired to destroy. The switch 16 is preferably of the solid state type free of any moving parts.

The normally open switch 16 interrupts or opens a ground lead to a battery circuit 17. When the switch is closed, the battery circuit is completed to ground and supplies energy to the magnetic detection circuit 2.

The circuit 2 includes an oscillator bridge circuit 18, and a null detector circuit 19. The oscillator circuit is initially balanced for a predetermined condition of magnetic mass effect. The balanced condition is obtained by adjusting the frequency of the oscillator circuit by means of an adjustable core 22 and/or an adjustable capacitor suggested by a knob control 23. The balanced condition is ascertained by detecting the null condition in the bridge circuit.

The balanced condition of the circuit is upset or unbalanced by a magnetic object moving into close proximity of the oscillator, whereby the Q of the oscillator is affected causing a frequency shift. This frequency shift is detected in the null circuit 19 which produces an electrical output amplified at 20; the output of the amplifier being applied to a second solid state switch 21 over lead 24.

The switch 21 is also normally open, being connected at one end to the battery 17. When the switch is closed, the battery power is connected to the detonator 3 through a mechanical arming switch 25.

In summary, the magnetic mass detection circuit 2 operates only when the output voltage from the vibration sensitive circuit is sufficient to close the first switch 16. The output voltage produced by circuit 2 closes the second switch 21, which connects the battery 17 directly to the detonator 3, assuming, of course, that the switch 25 has been armed.

The null is preferably set in the field by closing the calibration switch 26, thereby energizing the magnetic circuit and setting the oscillator frequency adjustment. The balanced condition may be indicated on a readiness indicator 27 through switch 28; the switches 26 and 28 being ganged together. After the null is set, the mechanical arming device is closed.

Since the crystal exciter and the magnetic resonator require no battery power, the life of the battery is maximized because there is no unnecessary dissipation. In practice the mine life should approximate the battery shelf life.

By way of example, the exciter crystal is about the size of a quarter. The mass consists of approximately two ounces of lead, the resonant bar being about 2 inches long and ¼ inch in diameter, and the magnetic circuit being about 8 to 10 potted cubic inches. Allowing for air coupling, the entire novel device can be potted as a unit with only the oscillator adjustment, the calibration switch, the readiness indicator, the mechanical arming switch and the dentonator being exposed.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A proximity fuse system for automatically detonating an explosive charge in response to the presence of a moving magnetic body in the neighborhood thereof, said fuse system comprising pressure responsive transducer means mounted in the neighborhood of said explosive charge, said transducer means producing electrical output signals in response to vibrations produced by said moving body in the neighborhood of said explosive charge, an electro-mechanical oscillator coupled to the output of said transducer means, said electro-mechanical oscillator receiving its entire operating power from the output signal of said transducer means and oscillating in response to said output signal, normally open electrical switch means coupled to said electro-mechanical oscillator and actuated by oscillations therefrom; magnetic mass detecting means coupled between said electrical switch means and a potential source, said magnetic mass detecting means being energized by the actuation of said electrical switch means, detonator means, and means coupling the output of said detecting means to said detonator means, whereby an output signal is produced from said detecting means to cause detonation of said explosive charge upon the presence of said magnetic body being sensed by said detecting means while signals induced by vibrations from said body are concurrently developed by said transducer means.

2. The combination defined in claim 1 wherein said electrical switch means is actuated when said oscillations exceed a predetermined value indicating the presence of certain types of moving bodies in the neighborhood of said explosive charge.

3. A proximity fuse system for automatically detonating an explosive charge in response to the presence of a moving magnetic body in the neighborhood thereof, said fuse system comprising transducer means mounted in the neighborhood of said explosive charge, said transducer means producing electrical output signals in response to mechanical vibrations induced therein by said moving body in the neighborhood thereof, an electro-mechanical oscillator coupled to the output of said transducer means, said electro-mechanical oscillator receiving its entire operating power from the output signal of said transducer means and oscillating in response to said output signal, said oscillator having an output amplitude proportional to the amplitude of the vibrations induced in said transducer means by said moving body, normally open electrical switch means coupled to said oscillator, said electrical switch means being actuated when the oscillations of said oscillator exceed a predetermined amplitude indicating the presence of certain types of moving bodies in the neighborhood of said explosive charge, a magnetic mass detector coupled to said electrical switch means, said detector when energized being sensitive to magnetic variations in the region of said explosive charge to thereby produce an output signal having an amplitude determined by the magnitude of said magnetic variations indicating the presence of selected bodies in the neighborhood of said explosive charge, said detector being energized by the actuation of said electrical switch means, and detonator means coupled between said detector and said explosive charge, whereby said output signal from said detector causes detonation of said explosive charge when said output signals are developed simultaneously by said transducer means and said detector in response respectively to the vibrations produced and to the magnetic field variations proudced by said body.

4. The combination defined in claim 3 wherein said detector includes an electrical oscillator which receives its operating power from a power source, said electrical switch means being coupled between said electrical oscillator and said power source and being operable when actuated to connect said power source to said electrical oscillator, said electrical oscillator including a resonant circuit responsive to variations of the magnetic field in the neighborhood of said explosive charge to vary the frequency of said electrical oscillator, a frequency discriminator circuit coupled to said electrical oscillator to produce an output signal proportional to the frequency of said electrical oscillator, second electrical switch means coupled to the output of said frequency discriminator circuit, said second electrical switch means being actuated when the output of said frequency discriminator circuit exceeds a predetermined magnitude indicating a predetermined amount of variation of the magnetic field in the neighborhood of said explosive charge, said second switch means being coupled to said detonator means to cause detonation of said explosive charge upon actuation of said second switch means.

5. The combination defined in claim 3 wherein said electro-mechanical oscillator comprises a resonant circuit which includes a mechanical member, said member being mechanically resonant at a predetermined frequency when actuated by said output signals from said transducer means.

6. The combination defined in claim 5 which further comprises a magnet rigidly attached to said mechanical member, an output winding mounted near said magnet to produce A.C. output signals in response to vibrations of said magnet, and a feedback winding mounted near said magnet to apply a driving force to said magnet in response to feedback signals applied thereto from said output winding.

7. The combination defined in claim 6 wherein said output winding is coupled to the input of an amplifier and phase shifter circunit and said feedback winding is coupled to the output of said amplifier and phase shifter circuit, and wherein said amplifier and phase shifter circuit is also coupled to receive the output signals from said transducer means, said output signal from said transducer constituting the entire operating power for said electro-mechanical oscillator.

8. The combination defined in claim 7 which further includes a rectifier and a filter capacitor coupled between said transducer means and said amplifier and phase shifter circuit.

References Cited in the file of this patent

UNITED STATES PATENTS

| | | |
|---|---|---|
| 1,491,004 | Duffie | Apr. 22, 1924 |
| 2,379,447 | Lindsey | July 3, 1945 |
| 2,958,280 | Gilfillan et al. | Nov. 1, 1960 |